Patented Nov. 10, 1931

1,830,934

UNITED STATES PATENT OFFICE

THOMAS S. CURTIS, OF HUNTINGTON PARK, LOS ANGELES, CALIFORNIA, ASSIGNOR, BY MESNE ASSIGNMENTS, TO PACIFIC-SOUTHWEST TRUST & SAVINGS BANK, TRUSTEE, OF LOS ANGELES, CALIFORNIA, A CORPORATION OF CALIFORNIA

COMPOSITION FOR CERAMIC USES, AND METHOD OF MAKING THE SAME

No Drawing.   Application filed September 5, 1925.  Serial No. 54,827.

In the development of the ceramic arts there have been discovered from time to time certain mineral substances that when added to ceramic materials, will enhance greatly the strength thereof, and possibly afford other advantageous qualities, in the products made from such materials. Such products may embrace, for instance, all objects made from burnt clay. Minerals of the sillimanite class have been found quite valuable in improving ceramic products by producing superior strength therein. But such minerals are relatively scarce, and where found, are located in places of inaccessibility such that the cost of mining and bringing them to places of production makes them quite expensive. For many applications, or ceramic uses, which I have in mind therefore this cost of sillimanite makes its employment prohibitive.

Desirous of using some mineral substance for the purposes suggested, and others to be later stated, I have had recourse to the mineral known as pyrophyllite ore which is composed of hydrous aluminum silicate. This is found in relatively large quantities in several sections of this country, and while in its crude state associated with various products of decomposition (not now known) and metamorphism, it is not available for my purposes, I have devised a special mode of treatment of the same whereby I produce a composition having substantially all the properties of the sillimanite class of minerals as used for ceramic purposes. Owing to the availability of pyrophyllite ore in large quantities close to production points, my composition made therefrom may be produced at much less cost than any for the same purposes heretofore referred to, or now being used in commercial practice.

My composition of this invention has proved of especial advantage for increasing in substantial proportions the mechanical strength of products made from clay, when added in even small proportions to the clay. The results of the admixture are such indeed, that the factor of durability of the resultant products, by way of resistance to impact is tremendously enhanced. Moreover, by adding my composition to the clay, in the absence of addition of fluxes, I have found an important increase in toughness, which in other words, may be expressed as tensile, cross-breaking, and compressive strength, while not producing hardness. The foregoing are obvious desiderata in the art.

Tests show that where hardness is required, the same may be achieved by supplying an admixture of my composition, and clay, with any of the customary fluxes such as magnesium carbonate, etc. There is thus provided a porcelain-like mass having a hardness far superior to that of porcelain, with the added feature of great toughness and resistance to impact.

Still another interesting feature of the composition of my invention resides in that the addition thereof to the raw clay does not create strength as a result of vitrification as is the case when a flux like feldspar is used. My composition to the contrary produces increased porosity in the final fired product. The degree of porosity is largely in direct proportion to the amount of the composition added. This phase of action of my invention is highly important for it may promote the insulating qualities of certain ultimate burned clay products such as terra cotta building material, bricks, hollow tile, etc.

In practical terms, the composition of my invention is found to possess another important characteristic. Added to clay it neutralizes or reduces the firing shrinkage of the clay doubtless due to its own expansion. Thus where fired clay objects must be made accurately to size, complete results will be attained by properly proportioning my composition and clay mixture so that neither expansion, nor shrinkage, of the molded article will be obtained.

From the view point of refractory properties my composition discloses under test that when mixed with ball clay or fire clay the melting point is increased almost in the proportions of the percentage of composition added. Admixed alone as a cement or grout, with plastic fire clay, my composition is of singular value in eliminating fire shrinkage of clay bodies.

In the carrying out of my invention; the pyrophyllite ore used as the crude material is mined in rock formation and contains certain impurities that are removed therefrom by my process of treatment. These impurities largely are iron oxide, titanium oxide, lime and magnesia. Were the metallic oxides not removed they would produce discoloration and specks in the final product. The lime and magnesia are undesirable owing to their fluxing influence when the product to be made is for refractory purposes.

By careful microscopic examination on various sized grains produced by crushing rolls and other milling machinery, it has been determined that most of the lime and magnesia of pyrophyllite ore occur in a claylike substance which apparently had been deposited in the seams of the ore by water infiltration from above. The iron oxide and titania are found to be present chiefly in a crystalline mineral believed to be tourmaline which is found scattered throughout the ore in small particles. A certain amount of free quartz occurs in the veins but most of this can readily be removed by rough hand sorting.

My process for purification of the ore or pyrophyllite is as follows:

The crude ore in lumps approximately five inches diameter, is charged into a special type of furnace known as the Curtis converter. The operation in this furnace consists in raising the temperature of the fragmentary mass of ore to 1700° F., maintaining this temperature under neutral or slightly reducing combustion conditions for a period of approximately one hour to permit the heat to penetrate throughout the mass, then shutting off the air supply passing natural gas through the charge for a period of from four to six hours. By the end of this time the mass will have assumed a barely visible red heat and will have dropped in temperature to about 900° F. At the end of the gas or reducing period, as it is called, the gas is shut off and the converter tilted on its trunnions to dump the charge as quickly as possible in order that it may cool within a matter of minutes to prevent reoxidation of the reduced particles.

The real reduction of the ore commences when the air is shut off at the furnace, and the reduced ore has a slate gray appearance with a beautiful lustre somewhat similar to that of the mineral galena. In fracture it is cubical, quite similar also to galena. In the reduction of the ore it is essential to avoid overheating the same for a temperature in excess of 1800° F. tends to produce ferrous silicate and the latter is entirely non-magnetic and would of course prevent certain magnetic separation to be hereafter described.

The reduced ore is now passed through a jaw crusher and ball mill or set of rolls to comminute it to particles ranging from 8 mesh to fines. During the milling operation a strong suction is maintained on the milling apparatus which tends to draw out all very finely divided particles in which practically all of the clay-like substance previously referred to is to be found. This air floated powder constitutes a waste product and is thrown away. It comprises approximately five percent of the total weight charged into the mill. On passing from the mill the remainder, relieved of its impalpable flour, is passed over a 40 mesh screen through which pass the grains rich in free silica or quartz. As the quartz is undesirable the minus 40 product constitutes a second loss of tailings product for which at present we have no use but which may in the future prove of some value. The second tailings product constitutes approximately 15% of the total weight of ore charged into the mill.

The concentrate therefore consists of the 8 to 40 mesh grains which are found to contain very little impurity other than the tourmaline product previously described.

The 8 to 40 mesh concentrate is now passed over a high intensity magnetic separator which removes practically all of the tourmaline and with it of course some particles of attached mineral which do not contain tourmaline. This magnetic separation loss represents about 7% of the weight or ore charged into the mill. The final product therefore comprises about 73% of the original weight of crude ore, which recovery it will be seen, represents a very high one in the light of ordinary concentration operations some of which recover but a few percent of the ore charged into the mill.

The resulting product shows a chemical composition of approximately 52% alumina, 46% of silica and usually less than 2% of combined fluxes such as iron oxide, titania, magnesia and lime. By reconcentration over the magnetic separator it is possible to eliminate practically all of the remaining impurities but we do not find it necessary or desirable to do this except where a pure white ceramic material must be made.

It is important to observe the relatively large proportion of alumina to silica thus obtained, and care should be exercised in the selection of minerals for treatment according to the present process that are sufficiently rich in alumina to give the proportions recited, amounting almost or approximately to a three parts of alumina to two parts of silica. Theoretically perfect pyrophyllite is indicated by the formula $HAl(SiO_3)_2$, the constituents being indicated as 66.7 silica, 28.3 alumina and 5.0 water; but in the selection of the pyrophyllite above referred to, it is obvious that a greater richness of the alumina must be present in situ. It is, therefore, obvious that the mineral selected for treatment, whereby the final product comprises approximately 52% of alumina to 46% silica should be selected because of its richness in alumina rather than because of its classification as pyrophyllite.

The finished product in grain form is next charged into a ball mill or pebble mill or any suitable grinding machine which produces a large percentage of very fine flour and is ground to pass an 80 mesh screen.

The fine powder thus produced forms the finished product ready for use in the ceramic industry.

An exhaustive series of tests under practical commercial working conditions shows that this product imparts certain valuable characteristics to burnt clay wares as hereinbefore outlined, a number of which will be enumerated more specifically and described in detail below.

Mechanical strength

An admixture of 10% of my compound with 90% of English ball clay, made into a briquette, and fired in a ceramic kiln to cone 18 shows a resistance to impact of about 40 to 1 over the fired strength of the English ball clay alone. English ball clay is referred to and used for test purposes, first, because it is a standard ceramic material known to practically all ceramists the world over; and second, because it is one of the strongest bond clays known to the art. It is significant therefore that an addition of but 10% of my compound to this already strong clay should so greatly enhance its toughness. The addition of 50% to English ball clay increases its fired strength approximately 140 times while the addition of 70% to 30% of English ball clay increases the strength 158 times. The significance of this characteristic will be apparent at once when the relation of strength to durability of my burnt clay articles is taken into account, such as for instance ordinary crockery and earthenware, stone ware, white ware, and china, terra cotta building material, bricks and other articles made of burnt clay practically all of which may be enhanced in strength through the addition of small percentages of my compound.

It is notable that careful experiments show the above specified percentages to be the critical advantageous proportionings of my composition and clay. Increases or decreases in percentages relative to those stated do not appear to afford material advantages as my experiments thus far enlighten me. Nevertheless approximately the stated proportions afford effective results.

The precise action which takes place incident to the use of my product or composition, when combined with ceramic compositions of a clay nature, I cannot describe for at present the knowledge of ceramists of reactions that take place in clay bodies as they are fired is based largely upon conjecture and is too meager to be much relied upon. In the combination of my composition with clay, however I think that the great mechanical strength secured in these bodies through the use of my improved product is due to the formation of an interlocking network of microscopic crystals which form a continuous reinforcement or skeleton within the clay structure. To describe my theory without offering proof of its final accuracy which is now impossible it is believed that burnt clay represents a mass of microscopic crystals of unknown composition held together by a cementing matrix of relatively fusible glass. The strength of the burnt clay shapes is therefore a function of the strength and toughness of the glass which cements its particles together. Through the introduction of my improved product I introduce into the composition of the clay a greatly increased percentage of these crystals of unknown composition with the result that the percentage of crystals may grow to such proportions as to present an interlocking structure in which the glass merely fills the voids between the crystals acting rather as a pore filler than as a cement. This theory I believe to be substantiated by the fact that increasing percentages of my improved product in a clay body almost invariably result in great increased strength and toughness.

Refractory properties

My composition added to any good quality of ball clay or fire clay will increase its melting point very much in proportion to the percentage added. It strengthens the clay under the influence of high temperature by providing within the clay mass a skeleton of highly refractory crystals having a sharp melting point. To translate this latter property into understandable terms I may state that a brick composed of clay to which my composition has been added will bear a greater load at high temperature than a brick made of the same clay without the addition of said composition. In other words, the rigidity of the mass at high temperature is increased.

Therefore, it becomes apparent that additions of my product to bond clays will improve the refractory qualities of the bond clay by enhancing its strength and toughness and making the clay stiff and rigid under elevated temperatures. The percentages to be used will depend upon the nature of the ware being manufactured, but in general it can be said that increasingly beneficial results will be obtained with admixtures of 10%, 50% and 70% of my product to the raw clay portion.

As a refractory cement or grout my product added to a plastic fire clay is of exceptional advantage because of its property of eliminating the fire shrinkage in clay bodies. Admixed with the 8 to 40 mesh concentrate of my composition such a cement forms a valuable mixture for ramming or tamping into small furnaces to make a monolithic lining. The same admixture may be pressed or molded into bricks fired in an ordinary ceramic kiln in which case the resulting brick will have practically all of the stable properties of the new product itself.

My final product may be described as a silicate of alumina of peculiar physical structure. A typical analysis shows a ratio of approximately 52% alumina to 48% silica with a total flux content of approximately 2%, consisting of iron oxide, titania, lime and magnesia. The chemical composition is therefore not unlike that of a very refractory clay. The physical properties, however, are unique.

Having thus described my invention what I claim as new and desire to secure by Letters Patent is:

1. The process of making a ceramic material which consists of subjecting pyrophyllite to reduction by heat, cooling the reduced mass quickly to prevent reoxidation, and mechanically comminuting the resulting product.

2. The process of making a ceramic material, which consists of subjecting pyrophyllite to reduction by heat, cooling the reduced mass quickly to prevent reoxidation, separating out of the mass undesired materials associated therewith contained therein, and mechanically comminuting the resulting product.

3. The process of making a ceramic material, which consists of subjecting pyrophyllite to reduction by heat, cooling the reduced mass quickly to prevent reoxidation, crushing the mass to particles ranging from 8 mesh to fines, and drawing off by suction undesired materials associated therewith and contained in the crushed mass, and mechanically comminuting the resulting product.

4. The process of making a ceramic material, which consists of subjecting pyrophyllite to reduction by heat, cooling the reduced mass quickly to prevent reoxidation, crushing the mass to particles ranging from 8 mesh to fines, and drawing off by suction undesired materials associated therewith and contained in the crushed mass, removing from the mass the free silica, and mechanically comminuting the resulting product.

5. The process of making a ceramic material, which consists of subjecting pyrophyllite to reduction by heat, cooling the reduced mass quickly to prevent reoxidation, crushing the mass to particles ranging from 8 mesh to fines, and drawing off by suction undesired materials associated therewith and contained in the crushed mass, removing from the mass the free silica, subjecting the mass to magnetic separative action to remove other impurities contained therein, and mechanically comminuting the resulting product.

6. The process of making a ceramic material which consists of subjecting pyrophyllite to reduction by heat, cooling the reduced mass quickly to prevent reoxidation, and mechanically comminuting the resulting product and grinding the residue to a fine powder for use.

7. A composition for ceramic uses consisting of substantially pure residuum obtained from the pyrochemical reduction of pyrophyllite.

8. A composition for ceramic uses consisting of the substantially pure concentrated residuum obtained from the pyrochemical reduction of pyrophyllite ore.

9. A composition for ceramic uses consisting of finely comminuted substantially pure concentrated residuum obtained from the pyrochemical reduction of pyrophyllite ore.

10. A composition for ceramic uses consisting of the substantially pure concentrated residuum obtained from the pyrochemical reduction of pyrophyllite ore, the concentrated residuum having substantially all free metallic oxides removed therefrom.

11. A composition for ceramic use, comprising a mineral product from which substantially all undesirable materials associated therewith have been removed, and in which alumina and silica are retained in proportions of a preponderance of alumina, the product being substantially pure residuum obtained from the pyrochemical reduction of pyrophyllite.

12. A composition for ceramic use, comprising a mineral concentrate from which substantially all undesirable materials associated therewith have been removed, and in which alumina and silica are retained in proportions of not less than fifty per cent (50%) alumina, the mineral concentrate being substantially pure residuum obtained from the pyrochemical reduction of pyrophyllite ore.

13. A composition for ceramic use, comprising a mineral concentrate from which substantially all undesirable materials associated therewith have been removed and in which alumina and silica are retained in proportions of approximately three of the former to two of the latter, the mineral concentrate being finely comminuted substantially pure concentrated residuum obtained from the pyrochemical reduction of pyrophyllite ore.

14. A composition for ceramic use, comprising a mineral concentrate from which substantially all undesirable materials associated therewith have been removed and being an alumina-silica concentrate having a substantial preponderance of alumina and possessing substantially all the properties of the sillimanite class and conditioned to be mixed with ceramic clay for counteracting shrinkage therein, the said mineral concentrate being substantially pure concentrated residuum obtained from the pyrochemical reduction of pyrophyllite ore.

In testimony whereof I affix my signature.

THOMAS S. CURTIS.